US011936264B2

(12) United States Patent
Jones et al.

(10) Patent No.: US 11,936,264 B2
(45) Date of Patent: Mar. 19, 2024

(54) BUSBAR FOR ELECTRIC MACHINE (71) Applicant: BorgWarner Inc., Auburn Hills, MI (US)

(72) Inventors: Ryan J. Jones, Pendleton, IN (US); Mariusz J. Kalisz, Noblesville, IN (US); Scott W. Bitzer, Laguna Niguel, CA (US); Tim Sailors, Carmel, IN (US)

(73) Assignee: BORGWARNER INC., Auburn Hills, MI (US)

( * ) Notice: Subject to any disclaimer, the term of this patent is extended or adjusted under 35 U.S.C. 154(b) by 287 days.

(21) Appl. No.: 17/123,437

(22) Filed: Dec. 16, 2020

(65) Prior Publication Data
US 2021/0194308 A1 Jun. 24, 2021

Related U.S. Application Data (60) Provisional application No. 62/950,730, filed on Dec. 19, 2019.

(51) Int. Cl.
H02K 3/50 (2006.01)
(52) U.S. Cl.
CPC ........... *H02K 3/50* (2013.01); *H02K 2203/09* (2013.01)
(58) Field of Classification Search
CPC .............................. H02K 2203/09; H02K 3/50
USPC ......................................................... 310/71
See application file for complete search history.

(56) References Cited

U.S. PATENT DOCUMENTS

| 7,588,444 | B2* | 9/2009 | Kataoka | H02K 11/33 439/76.2 |
| 8,749,107 | B2* | 6/2014 | Trammell | H02K 3/50 310/71 |
| 10,224,782 | B2 | 3/2019 | Han | |
| 10,404,125 | B2* | 9/2019 | Nakahara | H02K 1/146 |
| 10,998,789 | B2* | 5/2021 | Tategata | H02K 3/50 |
| 2015/0137637 | A1* | 5/2015 | Jang | H02K 3/522 29/598 |
| 2015/0229178 | A1* | 8/2015 | Murakami | H02K 3/28 174/68.2 |

(Continued)

FOREIGN PATENT DOCUMENTS

JP 5734794 B2 6/2015
JP 2017085756 A 5/2017

(Continued)

OTHER PUBLICATIONS

International Search Report and Written Opinion for International Application No. PCT/US2020/065482; International Filing Date Dec. 17, 2020; Report dated Apr. 19, 2021 (pp. 1-9).

*Primary Examiner* — Alexander Talpalatski
(74) *Attorney, Agent, or Firm* — CANTOR COLBURN LLP (57) ABSTRACT

An electric machine includes a housing, a rotor rotatably mounted in the housing a stator fixedly mounted to the housing. The stator includes a stator core and a plurality of stator windings supported by the stator core. The stator core surrounds the rotor. A busbar including a plurality of electrically conductive members is coupled to the stator windings and an insulating cover extends across at least a portion of the electrically conductive members. A bracket is coupled to the busbar and one of the stator core and the housing, the bracket supporting the busbar in the housing.

7 Claims, 10 Drawing Sheets (56) References Cited

U.S. PATENT DOCUMENTS

| | | | | |
|---|---|---|---|---|
| 2015/0372554 A1* | 12/2015 | Hashimoto | .............. | H02K 3/38 |
| | | | | 310/71 |
| 2015/0381002 A1* | 12/2015 | Hashimoto | ............ | H02K 3/522 |
| | | | | 310/71 |
| 2016/0149454 A1* | 5/2016 | Haga | ........................ | H02K 3/28 |
| | | | | 310/71 |
| 2017/0033630 A1* | 2/2017 | Tamura | .................... | H02K 3/18 |

FOREIGN PATENT DOCUMENTS

| | | | |
|---|---|---|---|
| JP | 2019180141 A | 10/2019 | |
| KR | 101016692 B1 | 2/2011 | |
| KR | 20140028967 A | 3/2014 | |

* cited by examiner

BUSBAR FOR ELECTRIC MACHINE

CROSS REFERENCE TO RELATED APPLICATIONS

This application claims the benefit of an earlier filing date from U.S. Provisional Application Ser. No. 62/950,730 filed Dec. 19, 2019, the entire disclosure of which is incorporated herein by reference.

BACKGROUND OF THE INVENTION

Exemplary embodiments pertain to the art of electric machines and, more particularly, to a bracket for securing a bus bar to a stator of an electric machine.

Electric machines include a stator having stator windings mounted to a housing and a rotor including rotor windings that rotates relative to the stator. The stator windings may be excited to impart a rotational forces on the rotor or, the rotation of the rotor may induce an electrical current in the stator windings. In the first operating mode, electrical current passes to the stator windings in the second operating mode, electrical current passes from the stator windings. As such, the stator windings are connected in a selected pattern and provided with terminals for connecting with an eternal device e.g., an external power source or an external load.

Currently, windings are connected by twisting and welding or soldering the winding ends. A circuit mount, into which the wires are inserted, is frequently used as insulation between the phases in the area of the winding ends. Terminals may be connected to select ones of the winding ends. The terminals provide an external interface. The winding ends are typically insulated and tucked out of the way in a housing of the electric machine. The electric machine is subjected to vibrations that may be caused by operation of the electric machine itself or from external environmental factors. Vibrations may cause the winding connections to weaken causing disruptions in operation. Accordingly, the industry would welcome a system that provides structural support for winding connections and terminals reduces operational interruptions.

BRIEF DESCRIPTION OF THE INVENTION

Disclosed is an electric machine including a housing, a rotor rotatably mounted in the housing a stator fixedly mounted to the housing. The stator includes a stator core and a plurality of stator windings supported by the stator core. The stator core surrounds the rotor. A busbar including a plurality of electrically conductive members is coupled to the stator windings and an insulating cover extends across at least a portion of the electrically conductive members. A bracket is coupled to the busbar and one of the stator core and the housing, the bracket supporting the busbar in the housing.

Also disclosed is a stator including a stator core, a plurality of stator windings supported by the stator core, a busbar including a plurality of electrically conductive members coupled to the stator windings and an insulating cover extending across at least a portion of the electrically conductive members. A bracket is coupled to the busbar and the stator core.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
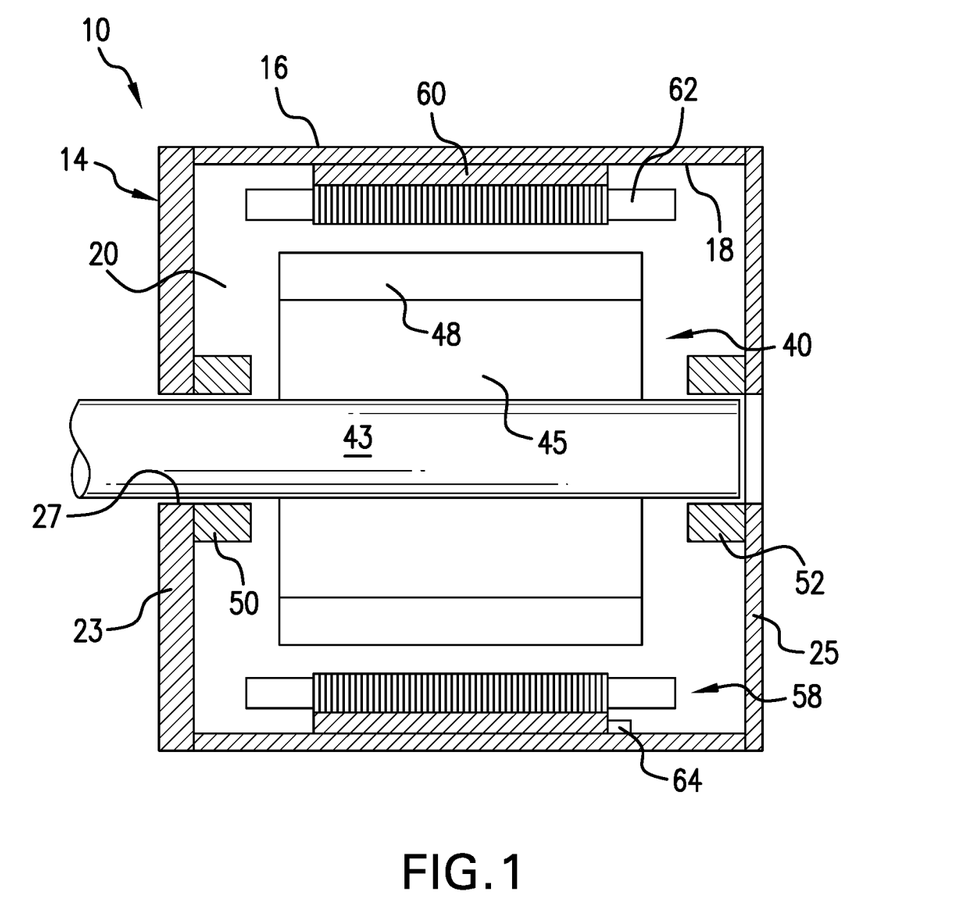
FIG. 1 depicts an electric motor including a busbar and support bracket, in accordance with an aspect of an exemplary embodiment.

With initial reference to FIG. 1, an electric motor in accordance with an exemplary embodiment, is indicated generally at 10. Electric motor 10 includes a housing 14 having an outer surface 16 and an inner surface 18 that defines an interior 20. Housing 14 includes a first end wall 23 and an opposing second end wall 25. One of the first and second end walls 23, 25 may be integrally formed with housing 14 while another of the first and second end walls 23, 25 may be removable. Of course, both the first and second end walls 23 and 25 may be removable. First end wall 23 includes an opening 27.

Electric motor 10 includes a rotor 40 rotatably mounted in interior 20. Rotor 40 includes a shaft 43 which supports a rotor core 45 surrounded by a plurality of rotor windings 48. Shaft 43 includes a first end (not separately labeled) that extends through opening 27 and is supported by a first bearing 50. First bearing 50 may be mounted to first end wall 23. Shaft 43 also includes a second end (also not separately labeled) that is supported at second end wall 25 by a second bearing 52. Rotor 40 is rotatable relative to a stator 58 mounted to, for example, inner surface 18. Stator 58 may also be mounted to, for example, second end wall 25. Stator 58 includes a stator core 60 that supports a plurality of stator windings 62. Stator windings 62 are connected to a busbar 64 that provides an interface with a terminal block (not shown) that, in turn, acts as an interface with a motor input or a motor output (also not shown) depending on operating mode.

Figure 2:
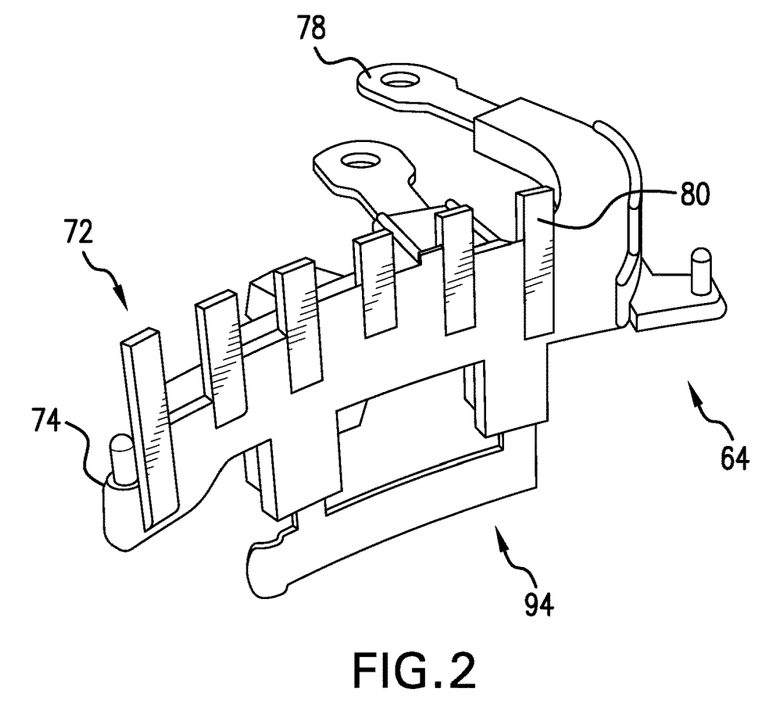
FIG. 2 depicts a perspective view of the busbar and support bracket, in accordance with an aspect of an exemplary embodiment.
Figure 3:
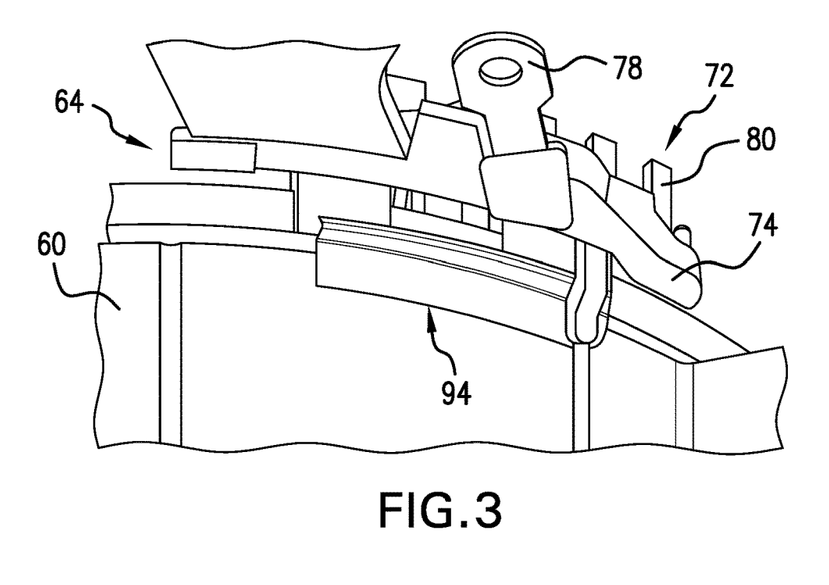
FIG. 3 depicts the busbar and support bracket secured to a stator core, in accordance with an exemplary aspect.

Referring to FIGS. 2 and 3, busbar 64 includes a plurality of electrically conductive members 72 that are shielded by an insulating cover 74. Plurality of electrically conductive members 72 includes a first end 78 that interfaces with the terminal block and a second end 80 that is connected to one or more of the stator windings 62. Busbar 64 may include a number of internal connections (not shown) that establish a wiring scheme for stator 58. For example, plurality of electrically conductive members 72 may be connected to establish a wye or a delta connection for stator 58. Towards that end, the number of first ends 78 may be different from the number of second ends 80 of the plurality of electrically conductive members 72.

Figure 4:
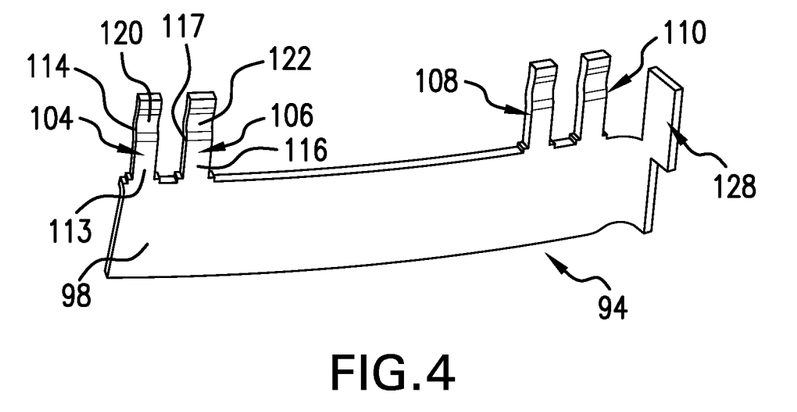
FIG. 4 depicts the support bracket, in accordance with an aspect of an exemplary embodiment.
Figure 5:
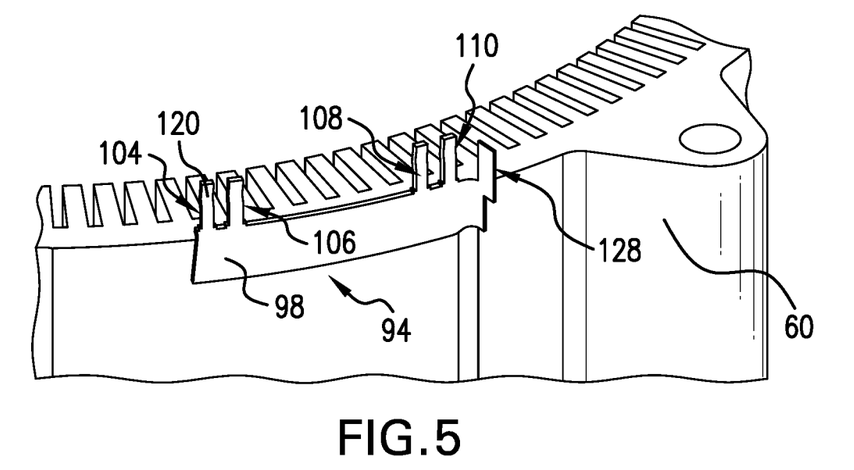
FIG. 5 depicts the support bracket secured to an outer surface of a stator core, in accordance with an exemplary aspect.
Figure 6:
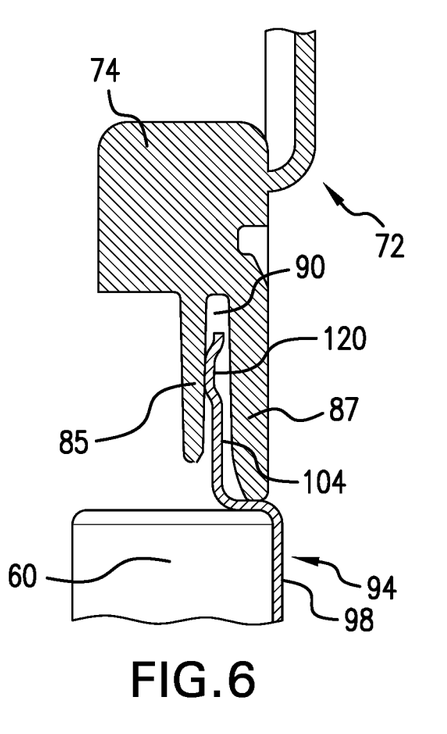
FIG. 6 depicts a busbar mounted to the support bracket of FIG. 5, in accordance with an exemplary aspect.

In an embodiment, insulating cover 74 includes a first wall 85 and a second wall 87 that are separated by a gap or groove 90 as shown in FIG. 6. Groove 90 provides an interface to a bracket 94 that connects busbar 64 to stator core 60. As shown in FIGS. 4 and 5, bracket 94 is formed from a metal material and includes a base portion 98 mounted to stator core 60. Base portion 98 may be welded to stator core 60 or secured through, for example, mechanical fasteners. A first tab member 104 and a second tab member 106 extend from a first end (not separately labeled) of base portion 98. A third tab member 108 and a fourth tab member 110 extends from an opposing end of base portion 98.

First tab member 104 includes a first radially outwardly facing side 113 and a second opposing or radially inwardly facing side 114. Similarly, second tab member 106 includes a first radially outwardly facing side portion 116 and a second opposing or radially inwardly facing side portion 118. Second side 114 includes a first protrusion 120 and first side portion 116 includes a second protrusion 122. As shown in FIG. 6, first protrusion 120 acts upon first wall 85. In a similar manner, second protrusion 122 acts upon second wall 87 to secure busbar 64 to bracket 94. It should be understood that third and fourth tab members 108 and 110 are similarly formed. Bracket 94 also includes a support member 128 that provides mechanical support for busbar 64. With this arrangement, busbar 64 provides a robust connection point for stator windings that may withstand vibrations and the like.

Figure 7:
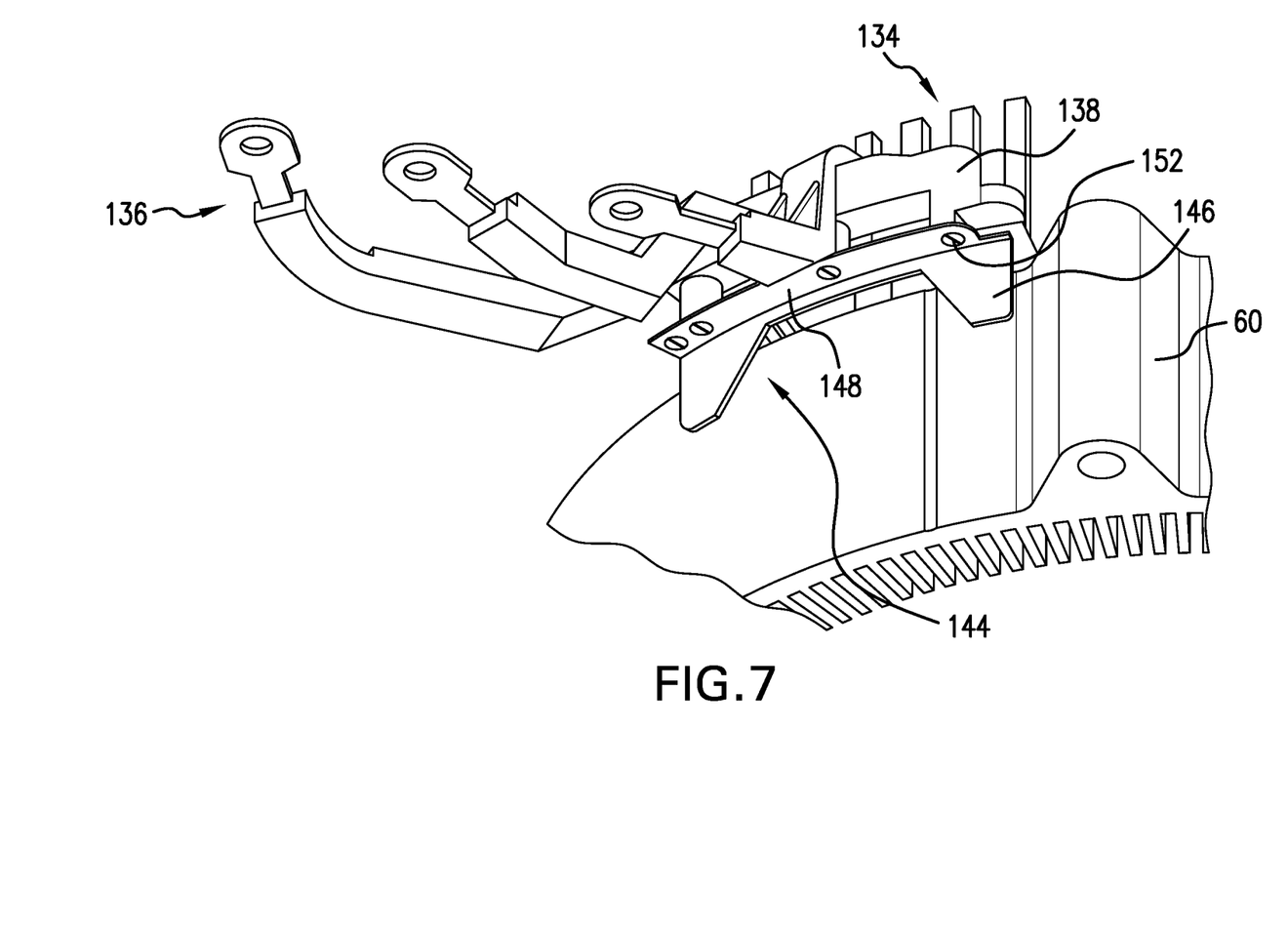
FIG. 7 depicts a busbar and support bracket mounted to a stator core, in accordance with another aspect of an exemplar embodiment.
Figure 8:
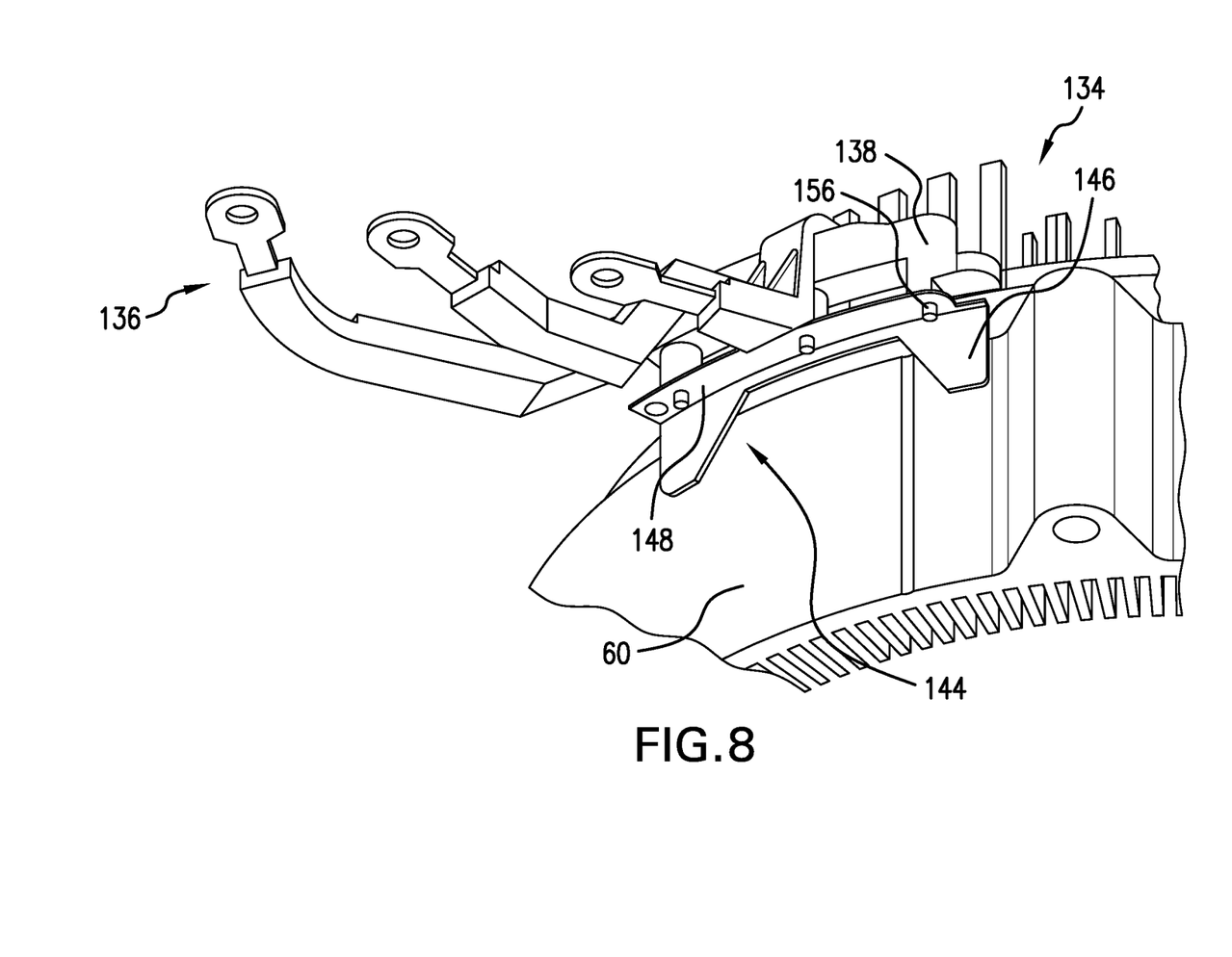
FIG. 8 depicts a busbar and support bracket mounted to a stator core, in accordance with yet another aspect of an exemplar embodiment.

A busbar 134, in accordance with another aspect of an exemplary embodiment, is shown in FIG. 7. Busbar 134 includes a plurality of electrically conductive members 136 surrounded by an insulating cover 138. Insulating cover 138 may also surround a number of internal connections (not shown) that establish a selected connection scheme for stator 58. Insulating cover 138 is mounted to a bracket 144 formed from a metal material having a first or base portion 146 and a second or support portion 148. Base portion 146 is mounted to an outer surface (not separately labeled) of stator core 60. Base portion 146 may be welded, brazed, or secured to the outer surface by fasteners (not shown). In one exemplary aspect, insulating cover 138 may be secured to support portion 148 through mechanical fasteners 152. In another exemplary aspect, insulating cover 138 may be secured to support portion 148 by heat stakes 156 as shown in FIG. 8.

Figure 9:
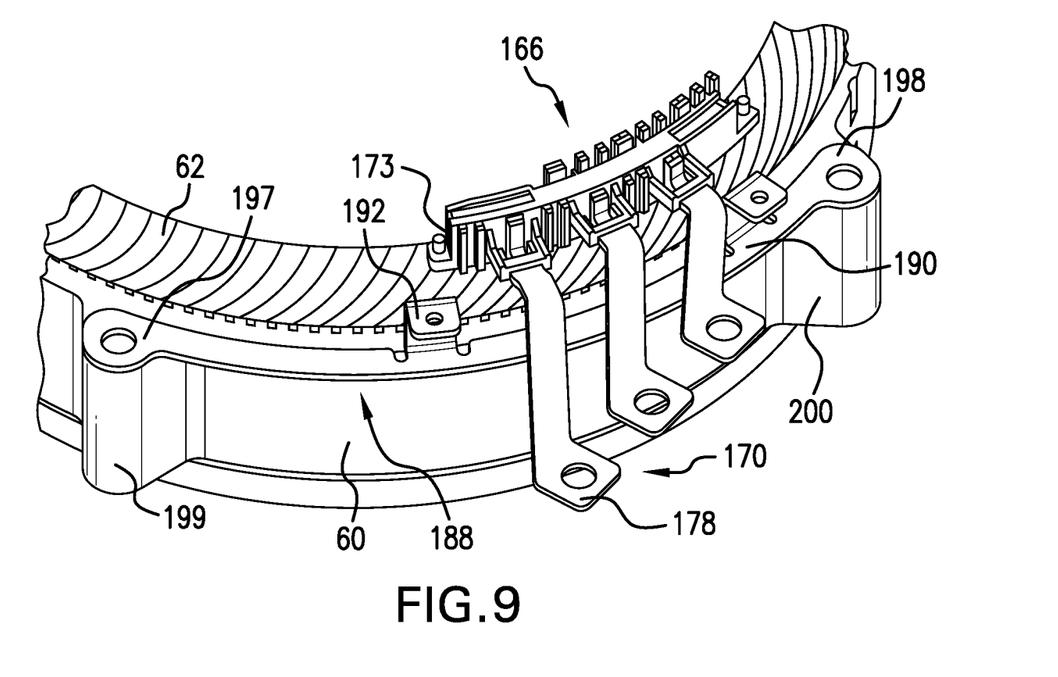
FIG. 9 depicts a busbar and support bracket mounted to a stator core, in accordance with still yet another aspect of an exemplar embodiment.
Figure 10:
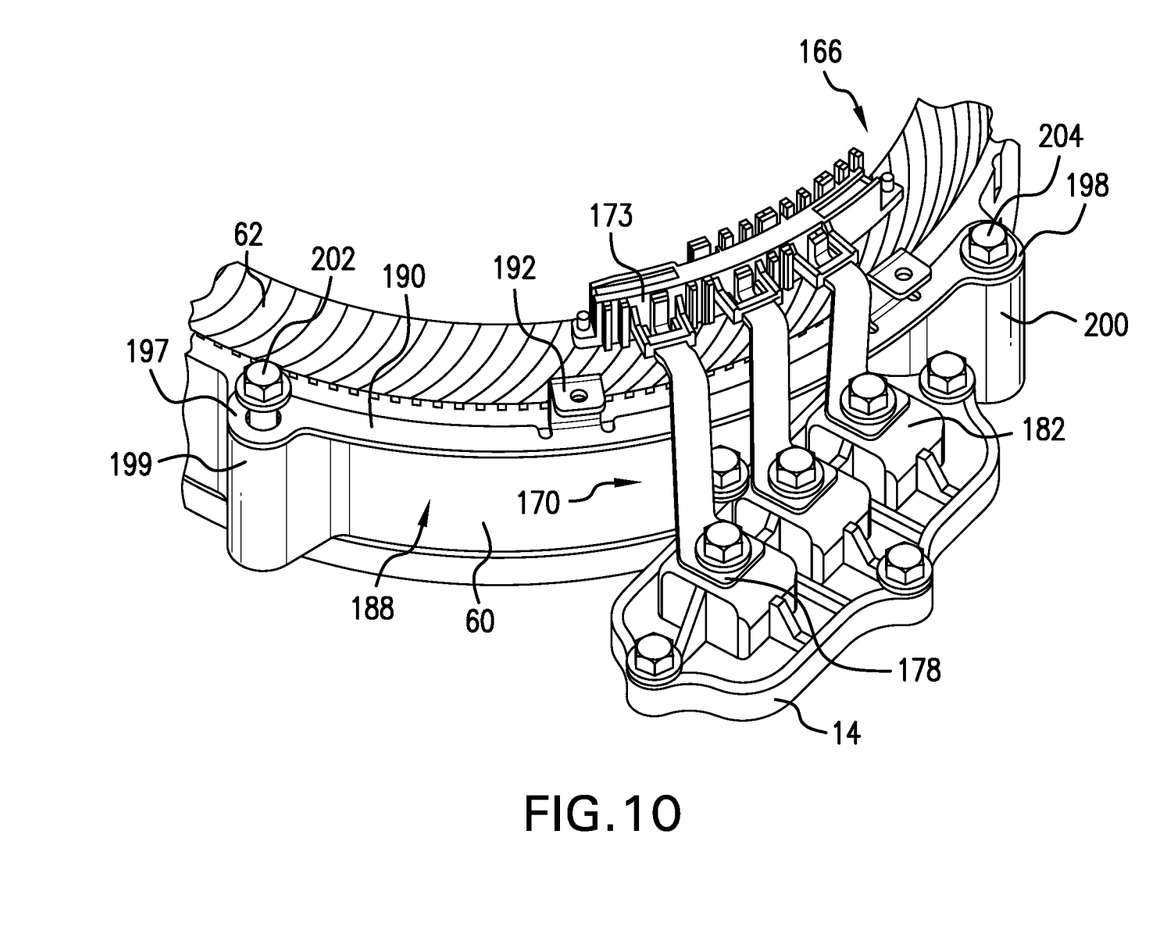
FIG. 10 depicts the busbar and support bracket of FIG. 9 showing electrically conductive members coupled to a terminal block in the electric motor, in accordance with an aspect of an exemplar embodiment.

Reference will now follow to FIGS. 9 and 10 in describing a busbar 166 in accordance with another exemplary aspect. Busbar 166 includes a plurality of electrically conductive members 170 that may be supported in an insulating cover 173. Insulating cover 173 may support a number of internal connections of stator windings 62 to establish a selected wiring configuration. Plurality of electrically conductive members 170 include a plurality of terminal end portions 178 that interface with a terminal block 182 in housing 14.

Busbar 166 is connected to a bracket 188 that is coupled to stator core 60. In an embodiment, bracket 188 is formed from a metal material and includes a first or base portion 190 and a second or support portion 192. Support portion 192 may provide an interface for a protective cover (not shown). Base portion 190 includes a first mounting element 197 and a second mounting element 198 that are connected to first and second mounting ears 199 and 200 of stator core 60 through mechanical fasteners 202 and 204. Bracket 188 provides a robust attachment port for busbar 166 that reduces strain on terminal end portions 178.

Figure 11:
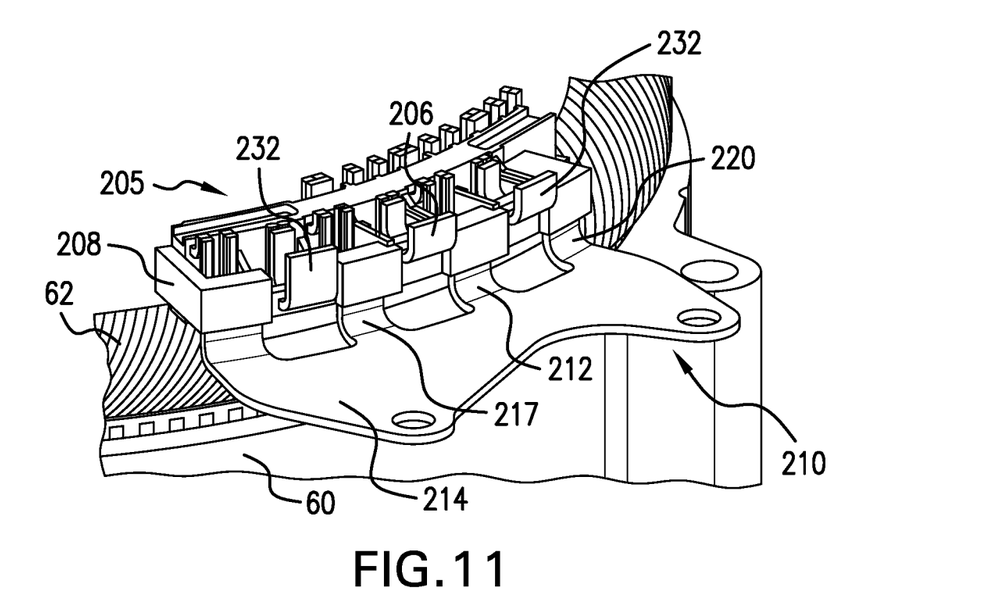
FIG. 11 depicts a perspective view busbar and support bracket positioned at a stator core, in accordance with another aspect of an exemplary embodiment.
Figure 12:
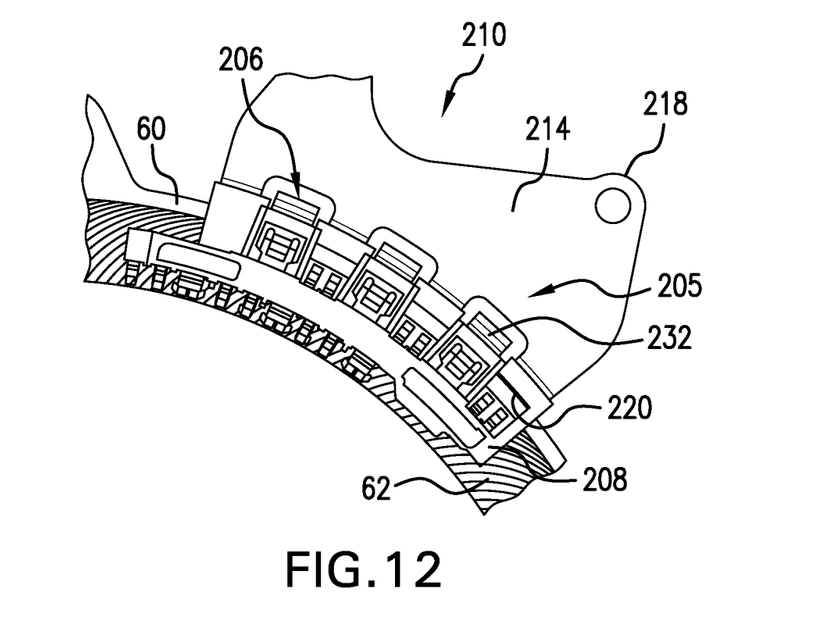
FIG. 12 depicts an upper view of the busbar and bracket of FIG. 11.
Figure 13:
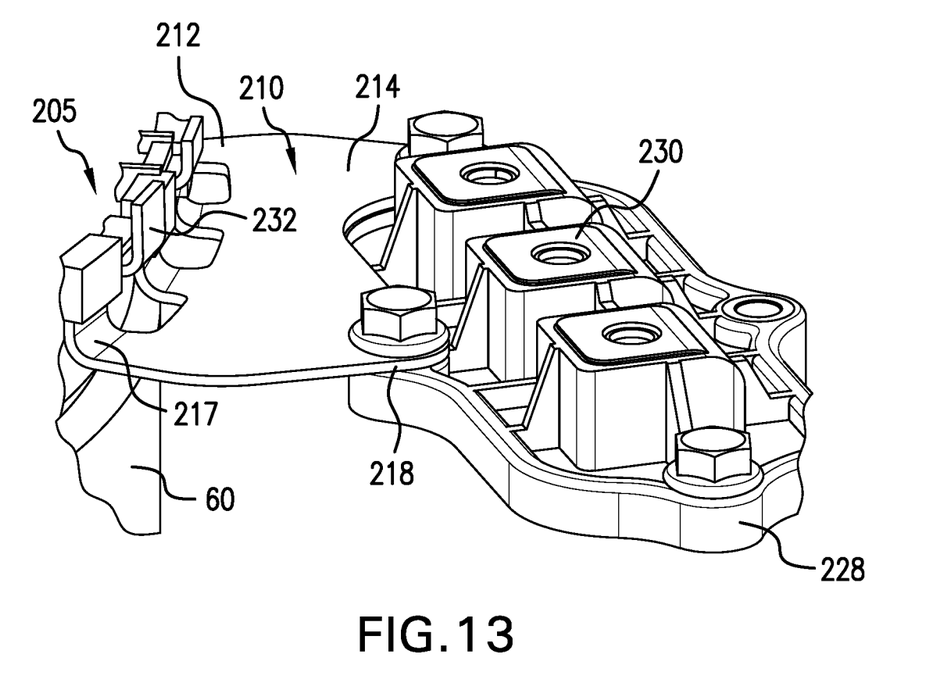
FIG. 13 depicts the bracket of FIG. 9 mounted to a terminal block of the electric motor, in accordance with an aspect of an exemplary embodiment.

Reference will now follow to FIGS. 11-13 in describing a busbar 205 in accordance with another exemplary aspect. Busbar 205 includes a plurality of electrically conductive members 206 supported by an insulating cover 208. Insulating cover 208 may support a number of internal connections of stator windings 62 to establish a selected wiring configuration. Busbar 204 is mounted to a bracket 210 that is cantilevered from housing 14. Bracket 210 is formed from a metal material and includes a first portion 212 that is connected to busbar 205 and a second portion 214 that is connected to housing 14. First portion 212 includes a plurality of tab elements 217 that extend axially outwardly of stator core 60. Second portion 214 includes mounting ears, one of which is indicated at 218, coupled to housing 14 through mechanical fasteners (not separately labeled).

Insulating cover 208 includes a plurality of pockets 220 that are receptive of tab elements 217. Insulating cover 208 may be joined to tab elements 217 through an adhesive, mechanical fasteners, staking, or, may be over-molded onto tab elements 217. Second portion 214 is mounted to housing 14 adjacent a terminal block 228 including a plurality of connecting pads 230. Connecting pads 230 may be coupled to terminal ends 232 of electrically conductive members 206. In this manner, terminal block provides an electrical interface with stator winding 62. Bracket 210 provides a robust attachment port for busbar 205 that reduces strain on terminal ends 232.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
a housing;
a rotor rotatably mounted in the housing;
a stator fixedly mounted to the housing, the stator including a stator core and a plurality of stator windings supported by the stator core, the stator core surrounding the rotor;
a busbar including a plurality of electrically conductive members coupled to the plurality of stator windings and an insulating cover extending across at least a portion of the plurality of electrically conductive members, the insulating cover including a first wall, a second wall, and a groove positioned between the first wall and the second wall; and
a bracket coupled to the busbar and one of the stator core and the housing, the bracket being secured directly to the one of the stator core and the housing by at least one of a welding process, a brazing process, and mechanical fasteners, the bracket being formed from a metal material and supporting the busbar in the housing, the bracket being formed from a metal material including a first tab member and a second tab member that extend into the groove, the first tab member including a first protrusion that engage the first wall and a second protrusion that engages the second wall.

2. The electric machine according to claim 1, wherein the bracket includes a first portion mounted to the stator core and a second portion supporting the insulating cover.

3. The electric machine according to claim 1, wherein the bracket is heat staked to the insulating cover.

4. The electric machine according to claim 1, wherein the bracket includes a first portion mounted to the housing and a second portion supporting the insulating cover.

5. The electric machine according to claim 4, wherein the second portion includes a plurality of tab elements extending substantially perpendicularly from the first portion.

6. The electric machine according to claim 5, wherein the insulating cover includes a plurality of pockets that are receptive of corresponding ones of the plurality of tab elements.

7. The electric machine according to claim 4, wherein the insulating cover is over-molded onto the second portion.

* * * * *